(12) United States Patent
Hamaguchi et al.

(10) Patent No.: US 9,785,991 B2
(45) Date of Patent: Oct. 10, 2017

(54) SERVICE PROVISION SYSTEM, SERVICE PROVISION METHOD, SERVER SYSTEM, AND NON-TRANSITORY COMPUTER-READABLE STORAGE MEDIUM HAVING STORED THEREIN SERVICE PROVISION PROGRAM

(71) Applicant: NINTENDO CO., LTD., Kyoto (JP)

(72) Inventors: Kenichi Hamaguchi, Kyoto (JP); Yuhei Ozawa, Kyoto (JP); Ryota Narita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 940 days.

(21) Appl. No.: 13/975,883

(22) Filed: Aug. 26, 2013

(65) Prior Publication Data

US 2014/0143084 A1 May 22, 2014

(30) Foreign Application Priority Data

Nov. 16, 2012 (JP) .................................. 2012-252260

(51) Int. Cl.
*G06Q 30/00* (2012.01)
*G06F 15/173* (2006.01)
(Continued)

(52) U.S. Cl.
CPC ........... *G06Q 30/0621* (2013.01); *G06F 9/50* (2013.01); *G06F 21/00* (2013.01); *G06F 21/10* (2013.01); *G06Q 30/02* (2013.01)

(58) Field of Classification Search
CPC .. G06F 21/00–21/10; G06F 9/45–9/50; H04N 21/26; H04N 12/48; H04N 12/28; G08C 15/06; G06Q 30/02
(Continued)

(56) References Cited

U.S. PATENT DOCUMENTS 6,496,928 B1 * 12/2002 Deo ...................... G06F 1/3209
380/270
7,835,736 B2 * 11/2010 Larocca ................ H04L 12/185
455/418
(Continued)

OTHER PUBLICATIONS

"PlayStation Official Site PlayStation3 Gaming Hardware", [online], Sony Computer Entertainment Inc., searched on Nov. 5, 2012, Internet URL:http://www.jp.playstation.com/ps3/hardware/#hardware-lineup, 6 pages.
(Continued)

*Primary Examiner* — Olusegun Goyea
(74) *Attorney, Agent, or Firm* — Nixon & Vanderhye P.C.

(57) ABSTRACT

A plurality of information processing apparatuses are each assigned an apparatus identification code and a group identification code. In a database of a server apparatus, when or before each of the information processing apparatuses is sold to a customer, a correspondence relationship between the apparatus identification code and the group identification code assigned to the information processing apparatus is stored. When having communicated with any one of the information processing apparatuses sold to a customer, the server apparatus acquires from the database a group identification code corresponding to the apparatus identification code received from the information processing apparatus, and provides a service based on the acquired group identification code.

13 Claims, 7 Drawing Sheets

(51) Int. Cl.
  *G06F 15/177* (2006.01)
  *G06Q 30/06* (2012.01)
  *G06F 21/00* (2013.01)
  *G06F 9/50* (2006.01)
  *G06Q 30/02* (2012.01)
  *G06F 21/10* (2013.01)

(58) Field of Classification Search
  USPC ............ 386/261; 709/200–223; 340/870.02; 705/14.39
  See application file for complete search history.

(56) References Cited

U.S. PATENT DOCUMENTS

| | | | | |
|---|---|---|---|---|
| 8,246,463 | B2* | 8/2012 | Kuwahara | A63F 13/12 463/39 |
| 2002/0029263 | A1* | 3/2002 | Toyoshima | H04L 41/18 709/223 |
| 2005/0071463 | A1* | 3/2005 | Bodin | H04L 12/2805 709/224 |
| 2005/0075115 | A1* | 4/2005 | Corneille | G06F 8/61 455/456.3 |
| 2005/0154883 | A1* | 7/2005 | Itkis | H04L 9/0833 713/163 |
| 2005/0181877 | A1* | 8/2005 | Kuwahara | A63F 13/12 463/42 |
| 2005/0228853 | A1* | 10/2005 | Yamamura | G06Q 10/10 709/200 |
| 2005/0238325 | A1* | 10/2005 | Tanabe | G06F 21/10 386/261 |
| 2006/0072444 | A1* | 4/2006 | Engel | G11B 7/24 369/275.1 |
| 2007/0011446 | A1* | 1/2007 | Kato | G06F 21/305 713/150 |
| 2007/0016581 | A1* | 1/2007 | Inoue | G06Q 10/10 |
| 2007/0118496 | A1* | 5/2007 | Bornhoevd | H04L 67/327 |
| 2007/0156492 | A1* | 7/2007 | Hawkins | G06Q 10/06 705/7.26 |
| 2007/0219000 | A1* | 9/2007 | Aida | G07F 17/32 463/42 |
| 2007/0232292 | A1* | 10/2007 | Larocca | H04L 12/185 455/425 |
| 2008/0016001 | A1* | 1/2008 | Nakano | G06F 21/10 705/58 |
| 2008/0068213 | A1* | 3/2008 | Cornwall | G01D 4/004 340/870.02 |
| 2008/0162729 | A1* | 7/2008 | Ruppert | G07F 17/323 709/249 |
| 2009/0113560 | A1* | 4/2009 | Kori | G06F 21/10 726/29 |
| 2009/0151006 | A1* | 6/2009 | Saeki | G06F 21/10 726/28 |
| 2010/0022309 | A1* | 1/2010 | Yatsuzuka | A63F 13/12 463/42 |
| 2010/0023778 | A1* | 1/2010 | Hauck | G06F 21/575 713/182 |
| 2010/0080202 | A1* | 4/2010 | Hanson | H04L 63/0853 370/338 |
| 2010/0131760 | A1* | 5/2010 | Fujita | G06F 21/10 713/168 |
| 2010/0325086 | A1* | 12/2010 | Skinner | G06F 17/30905 707/609 |
| 2011/0087766 | A1* | 4/2011 | Kuo | G06Q 10/06 709/224 |
| 2011/0231536 | A1* | 9/2011 | Tanaka | H04L 65/4084 709/223 |
| 2011/0268047 | A1* | 11/2011 | Nath | H04W 4/005 370/329 |
| 2012/0054835 | A1* | 3/2012 | Oda | G06F 13/385 726/4 |
| 2012/0173356 | A1* | 7/2012 | Fan | G06Q 10/101 705/26.1 |
| 2012/0210442 | A1* | 8/2012 | Ito | G06F 21/10 726/26 |
| 2012/0215662 | A1* | 8/2012 | Ito | G06F 21/10 705/26.61 |
| 2012/0265604 | A1* | 10/2012 | Corner | G06Q 30/02 705/14.39 |
| 2012/0291071 | A1* | 11/2012 | Seo | H04N 21/26283 725/41 |
| 2012/0311724 | A1* | 12/2012 | Mahan | G06F 21/629 726/29 |
| 2012/0326962 | A1* | 12/2012 | Asai | H04N 1/00474 345/156 |

OTHER PUBLICATIONS

"Presentation for Release of Wii U", [online], Nintendo Co., Ltd., posted on Sep. 13, 2012, Internet URL:http//www.nintendo.co.jp/wiiu/hardware/index.html, 4 pages.

* cited by examiner

| DATABASE | |
| --- | --- |
| APPARATUS IDENTIFICATION CODE | GROUP IDENTIFICATION CODE |
| 000000001 | GROUP A |
| 000000002 | GROUP A |
| 000000003 | GROUP A |
| 000000004 | GROUP A |
| ... | ... |
| 000001208 | GROUP B |
| 000001209 | GROUP B |
| 000001210 | GROUP B |
| 000001211 | GROUP B |
| ... | ... |

| SELLING NAME | CONTENTS OF SET | GROUP IDENTIFICATION CODE |
|---|---|---|
| BASIC SET | INFORMATION PROCESSING APPARATUS | BASIC |
| PREMIUM SET A | INFORMATION PROCESSING APPARATUS PERIPHERAL DEVICE A | PREMIUM—A |
| PREMIUM SET B | INFORMATION PROCESSING APPARATUS PERIPHERAL DEVICE B | PREMIUM—B |

FIG. 7

| SELLING NAME | SPECIFICATIONS | GROUP IDENTIFICATION CODE |
|---|---|---|
| 8-Gb WHITE VERSION | STORAGE CAPACITY: 8 Gb COLOR OF CASING: WHITE | 8G—W |
| 8-Gb BLACK VERSION | STORAGE CAPACITY: 8 Gb COLOR OF CASING: BLACK | 8G—B |
| 32-Gb WHITE VERSION | STORAGE CAPACITY: 32 Gb COLOR OF CASING: WHITE | 32G—W |
| 32-Gb BLACK VERSION | STORAGE CAPACITY: 32 Gb COLOR OF CASING: BLACK | 32G—B |

FIG. 8

| SELLING NAME | ADDITIONAL SERVICE | GROUP IDENTIFICATION CODE |
|---|---|---|
| BASIC SET | NO ADDITIONAL SERVICE | BASIC |
| SOFTWARE-A SET | SERVICE FOR DOWNLOADING SOFTWARE A | SOFT-A |
| SOFTWARE-B SET | SERVICE FOR DOWNLOADING SOFTWARE B | SOFT-B |

FIG. 9

| SERVICE-RELATED INFORMATION ||
|---|---|
| APPARATUS IDENTIFICATION CODE | NUMBER OF POINTS |
| 000000001 | 0 |
| 000000002 | 480 |
| 000000003 | 0 |
| 000000004 | 1500 |
| . . . | . . . |

SERVICE PROVISION SYSTEM, SERVICE PROVISION METHOD, SERVER SYSTEM, AND NON-TRANSITORY COMPUTER-READABLE STORAGE MEDIUM HAVING STORED THEREIN SERVICE PROVISION PROGRAM

CROSS REFERENCE TO RELATED APPLICATION

The disclosure of Japanese Patent Application No. 2012-252260, filed on Nov. 16, 2012, is incorporated herein by reference.

FIELD

The technology disclosed herein relates to a service provision system, a service provision method, a server system, and a non-transitory computer-readable storage medium having stored therein a service provision program.

BACKGROUND AND SUMMARY

Conventionally, a diverse lineup of information processing apparatuses of the same type (model) may be sold by varying the color or the pattern of the casing, varying the capacity of the hard disk, or varying a bundled item.

By thus selling a diverse lineup of information processing apparatuses of the same type, it is possible to provide sets or versions that meet customers' needs, and therefore increase customer satisfaction.

Thus, to increase customer satisfaction, it is desired to sell a plurality of information processing apparatuses by differentiating them in a diverse manner.

The above object can be achieved by, for example, the following configurations.

A first configuration example is a service provision system including a server system and a plurality of information processing apparatuses. The plurality of information processing apparatuses have a common device ID, and each of the information processing apparatuses is assigned an apparatus identification code uniquely assigned to the information processing apparatus and a group identification code commonly assigned to at least two or more of the information processing apparatuses. Each of the information processing apparatuses includes a storage unit, a first communication unit, and a transmission unit. The storage unit stores the apparatus identification code assigned to the information processing apparatus. The first communication unit communicates with the server system. The transmission unit, when the information processing apparatus has communicated with the server system, reads the apparatus identification code from the storage unit and transmits the read apparatus identification code to the server system. The server system includes a storage control unit, a second communication unit, a determination unit, and an information processing unit. The storage control unit stores in a database a correspondence relationship between the apparatus identification code and the group identification code assigned to each of the information processing apparatuses when or before the information processing apparatus is sold to a customer. The second communication unit communicates with each of the information processing apparatuses. The determination unit, when the second communication unit has communicated with any one of the information processing apparatuses (hereinafter referred to as a "first information processing apparatus") sold to a customer, receives the apparatus identification code corresponding to the first information processing apparatus from the first information processing apparatus, and acquires a group identification code corresponding to the received apparatus identification code from the database, thereby determining a group identification code corresponding to the first information processing apparatus. The information processing unit performs information processing for providing, in accordance with the group identification code determined by the determination unit, a service capable of being used from the first information processing apparatus via a network.

The plurality of information processing apparatuses may include information processing apparatuses in a plurality of versions different from each other in specifications, and each of the information processing apparatuses may be assigned the group identification code based on the version of the information processing apparatus.

Each of the information processing apparatuses may be sold as any one of a plurality of types of sets different from each other in bundled item, and the information processing apparatus may be assigned the group identification code based on the type of the set of the information processing apparatus.

Each of the information processing apparatuses may be sold as any one of a plurality of types of sets different from each other in additional service, and the information processing apparatus is assigned the group identification code based on the type of the set of the information processing apparatus. The information processing unit may provide the additional service in accordance with the group identification code determined by the determination unit.

When the group identification code determined by the determination unit is a particular group identification code, the information processing unit may perform information processing for providing a user of the first information processing apparatus with a particular service corresponding to the particular group identification code.

The information processing unit may download to the first information processing apparatus an application program or data based on the group identification code determined by the determination unit.

The server system may further include a service-related information storage unit configured to store service-related information related to a service to be provided to users of the information processing apparatuses, with respect to each information processing apparatus or each user. The information processing unit may create or update the service-related information corresponding to the first information processing apparatus or the user of the first information processing apparatus in accordance with the group identification code determined by the determination unit.

The service-related information may include the number of points capable of being used as a substitute for currency, and the information processing unit may add a point to the number of points included in the service-related information corresponding to the first information processing apparatus or the user of the first information processing apparatus in accordance with the group identification code determined by the determination unit.

The storage control unit may receive the correspondence relationship from a computer provided in a factory for manufacturing the information processing apparatus, and may store the received correspondence relationship in the database.

A second configuration example is a service provision method to be executed by a service provision system including a server system and a plurality of information processing apparatuses. The plurality of information processing apparatuses have a common device ID, and each of the information processing apparatuses is assigned an apparatus identification code uniquely assigned to the information processing apparatus and a group identification code commonly assigned to at least two or more of the information processing apparatuses. The service provision method includes: in the server system, storing in a database a correspondence relationship between the apparatus identification code and the group identification code assigned to each of the information processing apparatuses when or before the information processing apparatus is sold to a customer; in the information processing apparatus, when any one of the information processing apparatuses has communicated with the server system, reading the apparatus identification code assigned to the information processing apparatus from a storage unit of the information processing apparatus and transmitting the read apparatus identification code to the server system; in the server system, acquiring from the database a group identification code corresponding to the apparatus identification code received from the information processing apparatus, thereby determining a group identification code corresponding to the information processing apparatus; and in the server system, performing information processing for providing, in accordance with the group identification code determined by the determination unit, a service capable of being used from the information processing apparatus via a network.

A third configuration example is a server system for providing a plurality of information processing apparatuses with a service capable of being used from the information processing apparatuses via a network. The plurality of information processing apparatuses have a common device ID, and each of the information processing apparatuses is assigned an apparatus identification code uniquely assigned to the information processing apparatus and a group identification code commonly assigned to at least two or more of the information processing apparatuses. The server system includes a storage control unit, a communication section, a determination unit, and an information processing unit. The storage control unit stores in a database a correspondence relationship between the apparatus identification code and the group identification code assigned to each of the information processing apparatuses when or before the information processing apparatus is sold to a customer. The communication unit communicates with each of the information processing apparatuses. The determination unit, when the communication unit has communicated with any one of the information processing apparatuses sold to a customer, receives from the information processing apparatus the apparatus identification code stored in a storage unit of the information processing apparatus and assigned to the information processing apparatus, and acquires a group identification code corresponding to the received apparatus identification code from the database, thereby determining a group identification code corresponding to the information processing apparatus. The information processing unit performs information processing for providing, in accordance with the group identification code determined by the determination unit, a service capable of being used from the information processing apparatus via a network.

A fourth configuration example is a non-transitory computer-readable storage medium having stored therein a service provision program to be executed by a server system for providing a plurality of information processing apparatuses with a service capable of being used from the information processing apparatuses via a network. The plurality of information processing apparatuses have a common device ID, and each of the information processing apparatuses is assigned an apparatus identification code uniquely assigned to the information processing apparatus and a group identification code commonly assigned to at least two or more of the information processing apparatuses. The service provision program causes a computer of the server system to execute: storing in a database a correspondence relationship between the apparatus identification code and the group identification code assigned to each of the information processing apparatuses when or before the information processing apparatus is sold to a customer; communicating with each of the information processing apparatuses; when, in the communication, the server system has communicated with any one of the information processing apparatuses sold to a customer, receiving from the information processing apparatus the apparatus identification code stored in a storage unit of the information processing apparatus and assigned to the information processing apparatus, and acquiring a group identification code corresponding to the received apparatus identification code from the database, thereby determining a group identification code corresponding to the information processing apparatus; and performing information processing for providing, in accordance with the group identification code determined in the determination, a service capable of being used from the information processing apparatus via a network.

The service provision program may be stored in any computer-readable storage medium such as a CD or a DVD.

Based on an exemplary embodiment, it is possible to provide a service capable of being used from an information processing apparatus via a network, in accordance with a group identification code assigned to the information processing apparatus. This makes it possible to differentiate a plurality of information processing apparatuses in a diverse manner.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

With reference to the drawings, an exemplary embodiment is described below.

Figure 1:
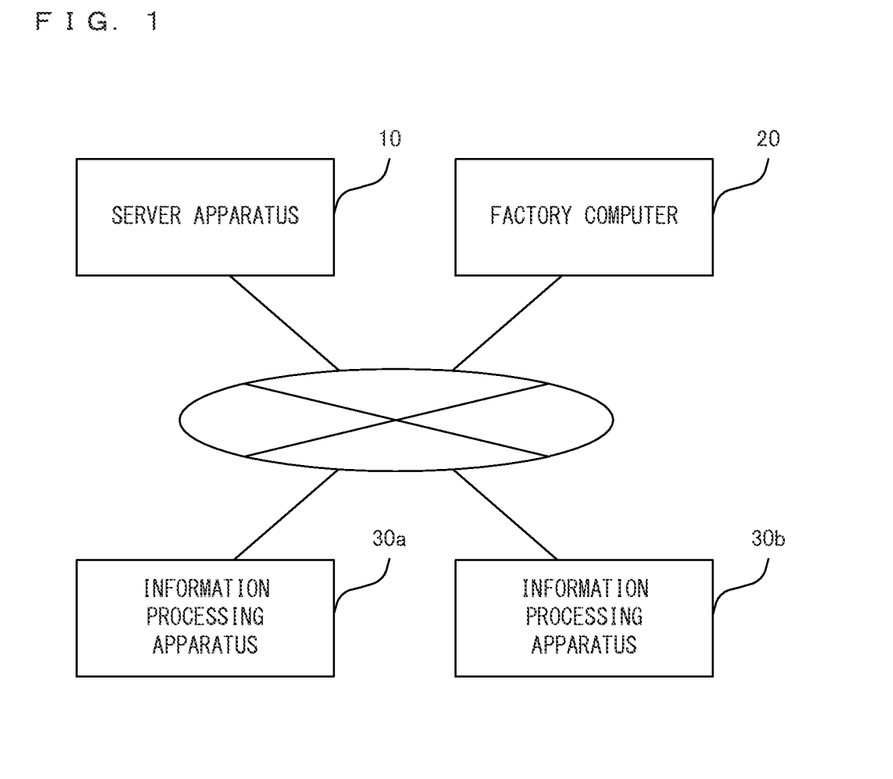
FIG. 1 is a diagram showing a non-limiting example of the configuration of a service provision system.

In FIG. 1, information processing apparatuses 30a and 30b are information processing apparatuses of the same type that have communication functions. The information processing apparatuses 30a and 30b are, for example, game apparatuses. It should be noted that, here, "the same type" does not mean that the specifications, such as the colors and the performances, of the information processing apparatuses are exactly the same. The information processing apparatuses may only need to have a common device ID (that is, may only need to be substantially of the same model). For example, the information processing apparatuses may be of the same model, but in versions different from each other in specifications. In this case, for example, the colors of the casings may be different, the storage capacities of the internal storage devices or the like may be different, or bundled items may be different. It should be noted that in the following descriptions, the information processing apparatuses 30a and 30b will be collectively referred to as "information processing apparatuses 30" if it is not particularly necessary to distinguish the information processing apparatuses 30a and 30b from each other.

Typically, the information processing apparatuses 30 are manufactured in a factory, are thereafter shipped from the factory, and are sold to customers through stores.

Each information processing apparatus 30 is assigned an apparatus identification code (for example, a serial number) for uniquely identifying each of a plurality of information processing apparatuses 30 of the same type. The information processing apparatus 30 is shipped from the factory with the apparatus identification code stored in an internal storage device of the information processing apparatus 30.

Each information processing apparatus 30 is assigned a group identification code, aside from the apparatus identification code. The group identification code is a code for classifying each of a plurality of information processing apparatuses 30 into any one of a plurality of groups. Unlike the apparatus identification code, the same group identification code is assigned to a plurality of information processing apparatuses 30 classified into the same group.

A server apparatus 10 is provided to provide the user of each information processing apparatus 30 with a service based on the information processing apparatus 30. Typically, the server apparatus 10 is managed by the manufacturer of the information processing apparatuses 30. When having been accessed by any one of the information processing apparatuses 30, the server apparatus 10 performs information processing for providing a service based on the group set for the information processing apparatus 30. As an example of the information processing, particular data (for example, particular game software, a particular content, or the like) may be downloaded to an information processing apparatus 30 corresponding to a particular group. As another example of the information processing, when the user of an information processing apparatus 30 corresponding to a particular group has purchased an article (for example, game software, a content, or the like) through the server apparatus 10, points corresponding to 10% of the price of the article (what can be used later as a substitute for cash) may be returned to the user.

A factory computer 20 is a computer provided in the factory for manufacturing the information processing apparatuses 30, and is typically a general-purpose computer. The factory computer 20 transmits, to the server apparatus 10, information representing the apparatus identification code and the group identification code assigned to each information processing apparatus 30 manufactured in the factory. The factory computer 20 transmits the information to the server apparatus 10 using, for example, a format and a protocol for electronic mail.

Figure 2:
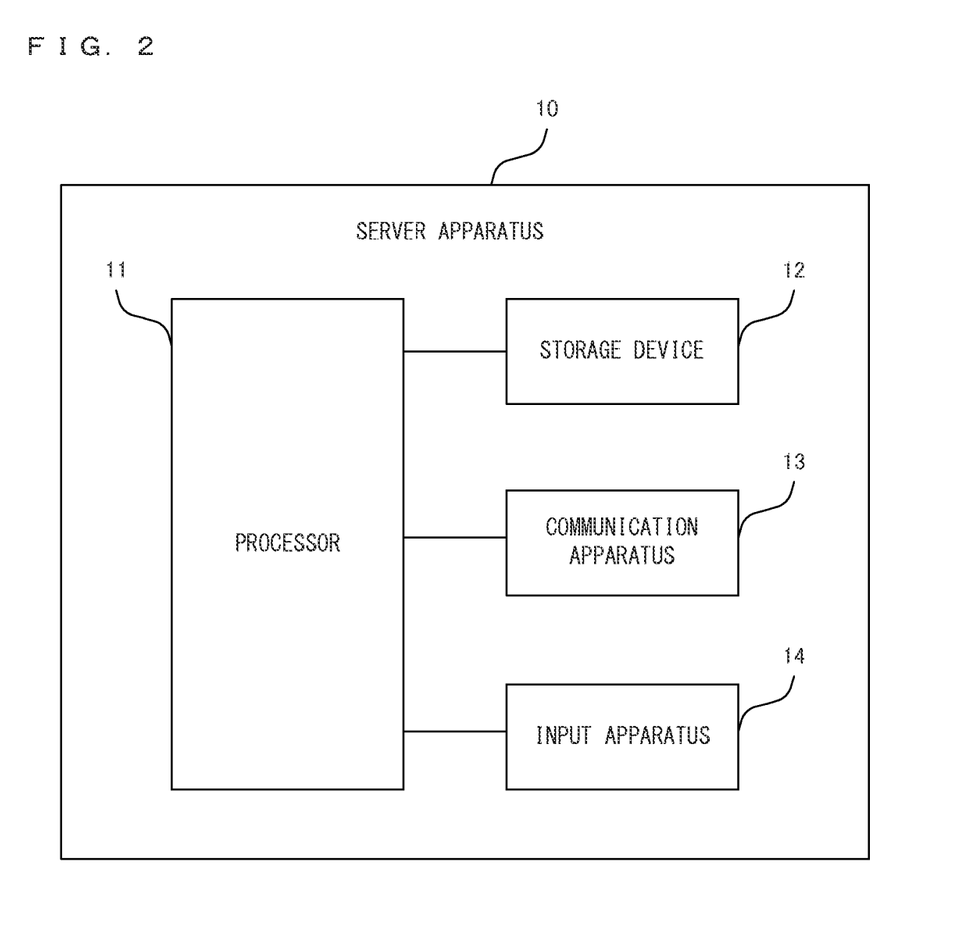
FIG. 2 is a diagram showing a non-limiting example of the configuration of a server apparatus.

Next, with reference to FIG. 2, the specific configuration of the server apparatus 10 is described.

In FIG. 2, the server apparatus 10 includes a processor 11, a storage device 12, a communication apparatus 13, and an input apparatus 14. It should be noted that the operation of the server apparatus 10 described later is achieved by the processor 11 executing a predetermined computer program stored in the storage device 12. The computer program may be installed in advance in the server apparatus 10, or may be provided to the server apparatus 10 through any computer-readable storage medium such as a CD or a DVD, or may be provided to the server apparatus 10 through communication with another information processing apparatus.

Figure 3:
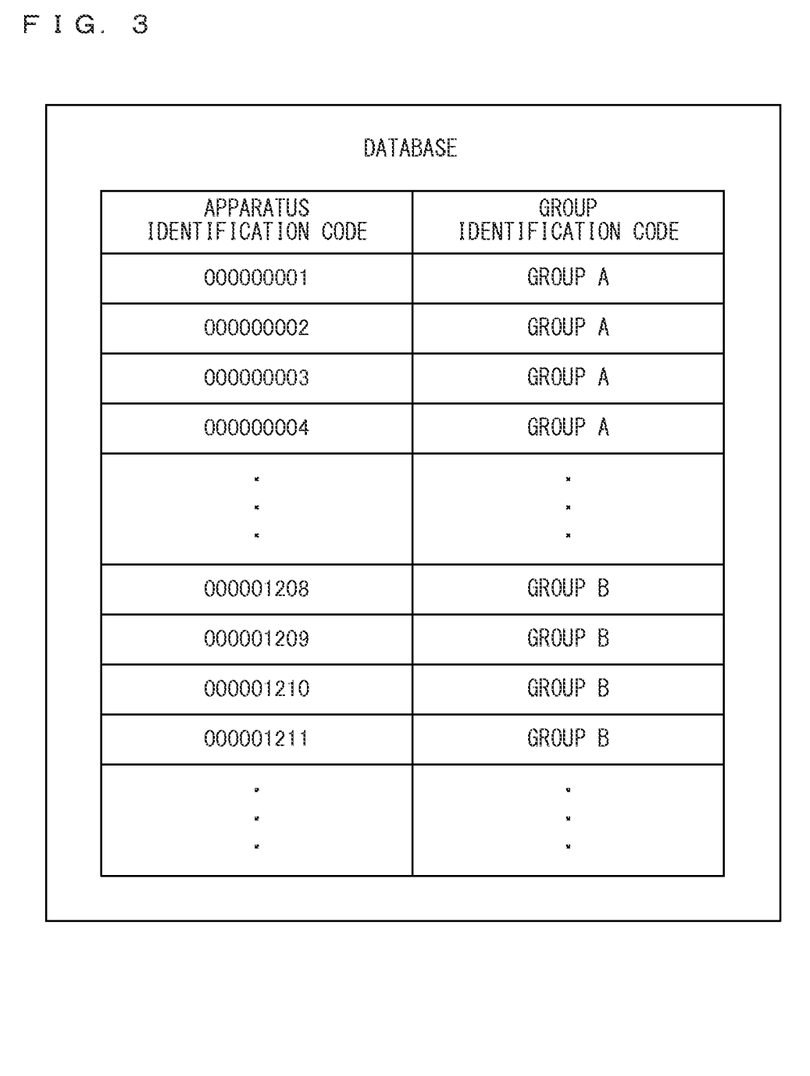
FIG. 3 is a diagram showing a non-limiting example of a database stored in the server apparatus.

The server apparatus 10 receives, from the factory computer 20 through the communication apparatus 13, information representing the apparatus identification code and the group identification code assigned to each information processing apparatus 30 manufactured in the factory. On the basis of the received information, the processor 11 stores in the storage device 12 the correspondence relationship between each information processing apparatus 30 and the group identification code (that is, the correspondence relationship between the apparatus identification code and the group identification code) as a database as shown in FIG. 3.

It should be noted that in another exemplary embodiment, information representing the correspondence relationship between each information processing apparatus 30 and the group identification code may be input through the input apparatus 14 by a user (for example, an administrator of the server apparatus 10). Then, on the basis of the information input through the input apparatus 14, the processor 11 may store in the storage device 12 the correspondence relationship between each information processing apparatus 30 and the group identification code as the database as shown in FIG. 3. It should be noted that the structure of the database shown in FIG. 3 is merely illustrative. Alternatively, similar information may be stored as a database having a different structure. For example, in the example of FIG. 3, the combination of the apparatus identification code and the group identification code is stored with respect to each apparatus identification code. Alternatively, in another exemplary embodiment, a plurality of apparatus identification codes and one group identification code may be associated together with respect to each group identification code.

Figure 4:
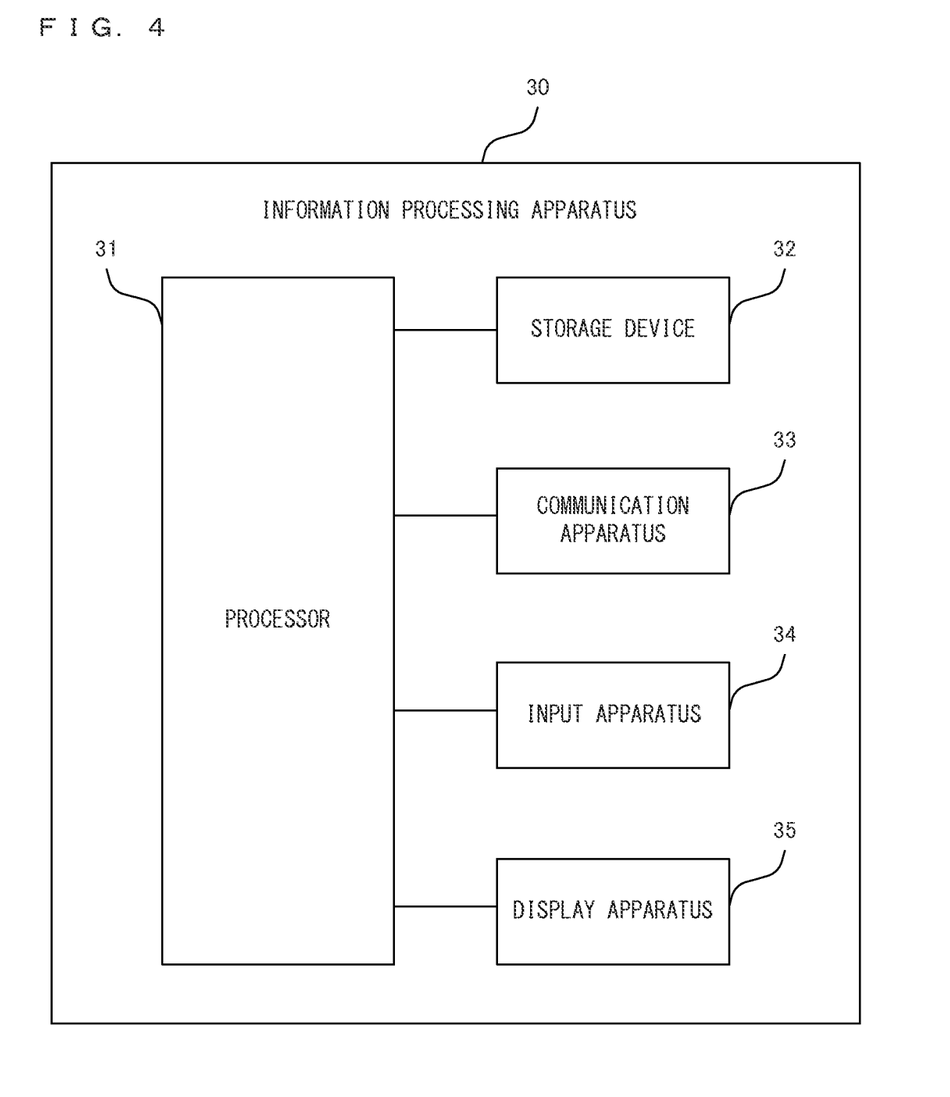
FIG. 4 is a diagram showing a non-limiting example of the configuration of an information processing apparatus.

Next, with reference to FIG. 4, the specific configuration of each information processing apparatus 30 is described.

In FIG. 4, the information processing apparatus 30 includes a processor 31, a storage device 32, a communication apparatus 33, an input apparatus 34, and a display apparatus 35.

In the storage device 32, the apparatus identification code assigned to the information processing apparatus 30 is stored in advance (that is, when or before the information processing apparatus 30 is sold to a customer). The information processing apparatus 30 can communicate with the server apparatus 10 through the communication apparatus 33. When the information processing apparatus 30 communicates with the server apparatus 10 through the communication apparatus 33, the processor 31 reads the apparatus identification code from the storage device 32 and transmits the read apparatus identification code to the server apparatus 10.

It should be noted that the storage device 32 can store various application programs (for example, a game program and the like). The processor 31 can execute the various application programs stored in the storage device 32 to perform processing based on an instruction input by a user through the input apparatus 34, and to cause an image reflecting the result of the processing to be displayed on the display apparatus 35.

Figure 5:
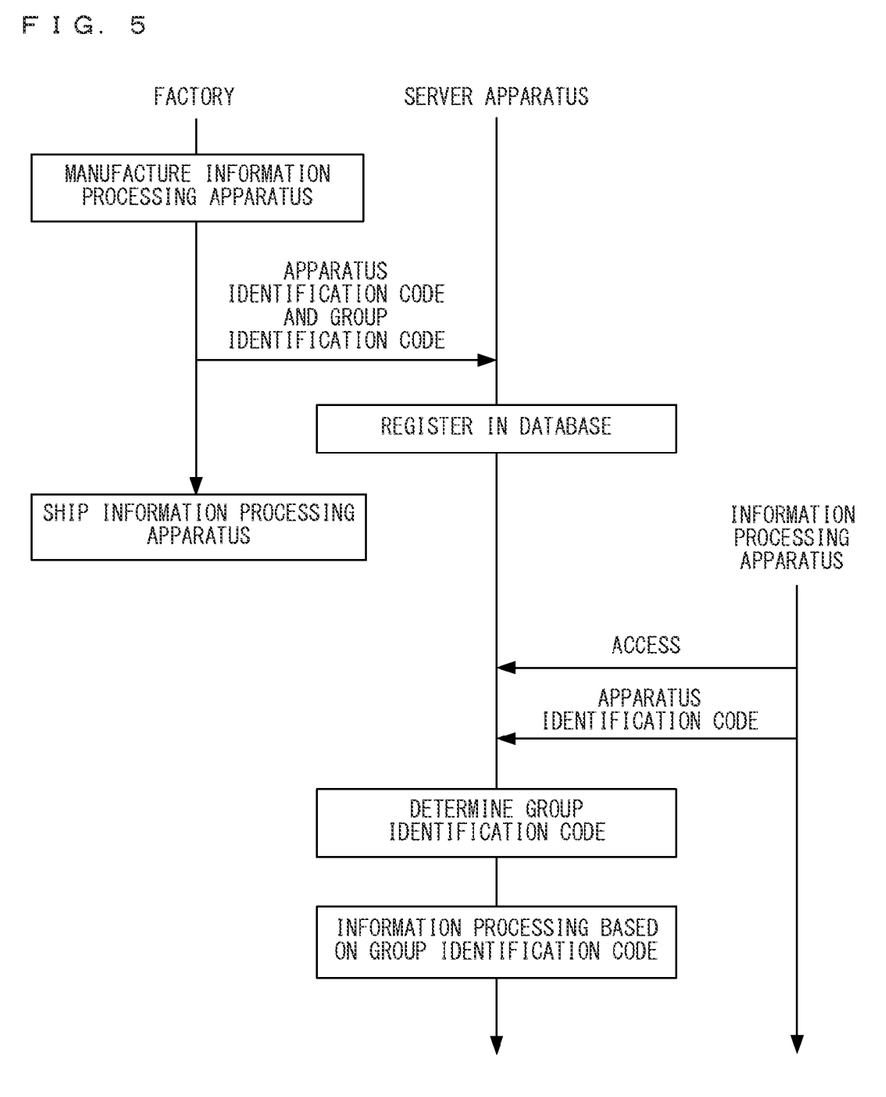
FIG. 5 is a diagram showing a non-limiting example of the processing flow of the server apparatus and the information processing apparatus.

Next, with reference to FIG. 5, the operations of the server apparatus 10, the factory computer 20, and the information processing apparatuses 30 are described.

First, the information processing apparatuses 30 are manufactured in the factory. At this time, each information processing apparatus 30 is assigned an apparatus identification code and a group identification code. Information representing the correspondence relationship between the apparatus identification code and the group identification code is stored in the factory computer 20. The factory computer 20 transmits to the server apparatus 10 the information representing the correspondence relationship between the apparatus identification code and the group identification code. Then, the information processing apparatuses 30 are shipped from the factory. The information processing apparatuses 30 shipped from the factory are sold to customers through stores.

When having received the information representing the correspondence relationship between the apparatus identification code and the group identification code from the factory computer 20, the server apparatus 10 registers on the basis of the received information the correspondence relationship between the apparatus identification code and the group identification code in the database (FIG. 3). Then, the server apparatus 10 waits for the information processing apparatuses 30 purchased by the customers to access the server apparatus 10.

Each information processing apparatus 30 accesses the server apparatus 10, for example, in accordance with an instruction from a user. Then, when the connection between the server apparatus 10 and the information processing apparatus 30 has been established, the information processing apparatus 30 transmits to the server apparatus 10 the apparatus identification code assigned to the information processing apparatus 30.

When having received the apparatus identification code from the information processing apparatus 30, the server apparatus 10 determines with reference to the database (FIG. 3) a group identification code corresponding to the received apparatus identification code. Then, in accordance with the determined group identification code, the server apparatus 10 performs information processing for providing a service capable of being used from the information processing apparatus 30 via a network.

This enables the server apparatus 10 to, when having communicated with an information processing apparatus 30, perform information processing based on the group identification code assigned to the information processing apparatus 30.

(Manner of Assigning Group Identification Code)

Next, descriptions are given of specific examples of the manner of assigning a group identification code to each information processing apparatus 30. It should be noted that basically, the manner of assigning a group identification code to each information processing apparatus 30 can be any manner. Only typical examples are described below.

In a first typical example of the manner of assigning a group identification code, when each information processing apparatus 30 is sold as any one of a plurality of types of sets different from each other in bundled item, a group identification code different depending on the type of the set is assigned to the information processing apparatus 30.

Figure 6:
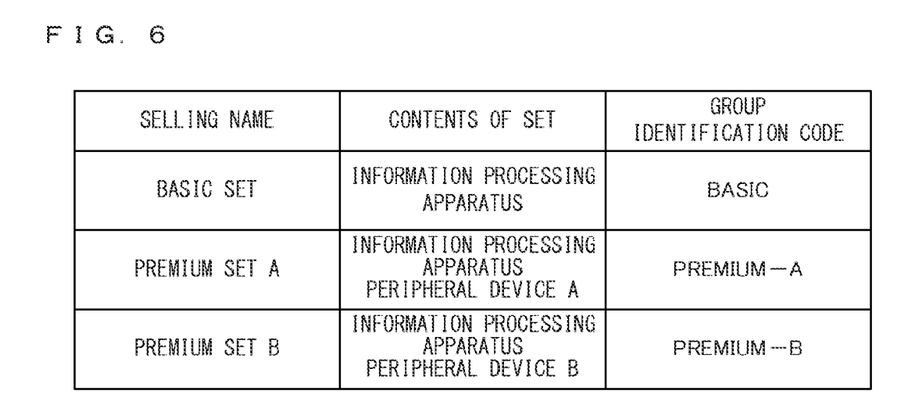
FIG. 6 is a diagram showing a non-limiting example of the manner of assigning a group identification code.

For example, as shown in FIG. 6, when the information processing apparatus 30 is sold as any one of three types of sets, namely a "basic set" in which the information processing apparatus 30 is sold solely, a "premium set A" in which the information processing apparatus 30 is sold in combination with a peripheral device A, and a "premium set B" in which the information processing apparatus 30 is sold in combination with a peripheral device B is sold, different group identification codes are assigned to the information processing apparatus 30 for the respective sets.

In a second typical example of the manner of assigning a group identification code, when each information processing apparatus 30 is sold as any one of a plurality of types of versions different from each other in specifications, a group identification code different depending on the type of the version is assigned to the information processing apparatus 30.

Figure 7:
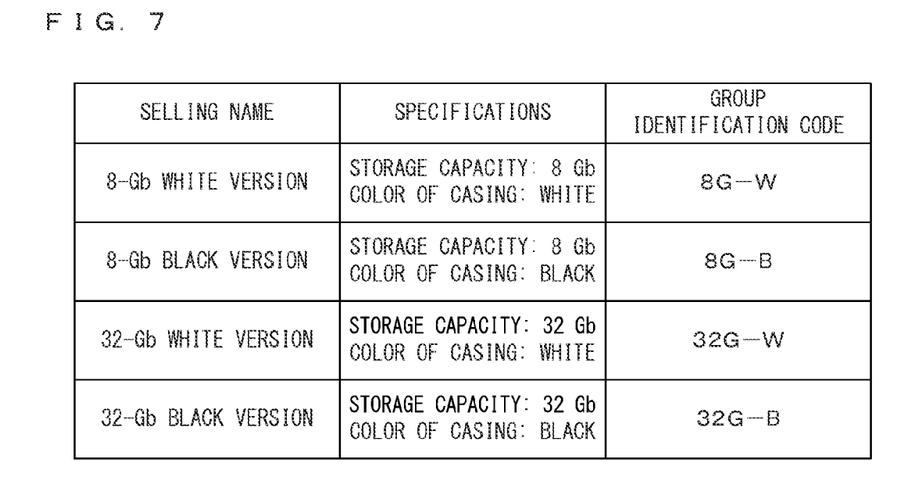
FIG. 7 is a diagram showing another non-limiting example of the manner of assigning the group identification code.

For example, as shown in FIG. 7, when the information processing apparatus 30 is sold as any one of four types of versions, namely an "8-Gb white version" in which the storage capacity of the internal storage device is 8 Gb and the color of the casing is white, an "8-Gb black version" in which the storage capacity of the internal storage device is 8 Gb and the color of the casing is black, a "32-Gb white version" in which the storage capacity of the internal storage device is 32 Gb and the color of the casing is white, and a "32-Gb black version" in which the storage capacity of the internal storage device is 32 Gb and the color of the casing is black, different group identification codes are assigned to the information processing apparatus 30 for the respective versions.

In a third typical example of the manner of assigning a group identification code, when each information processing apparatus 30 is sold as any one of a plurality of types of sets different from each other in additional service, a group identification code different depending on the type of the set is assigned to the information processing apparatus 30.

Figure 8:
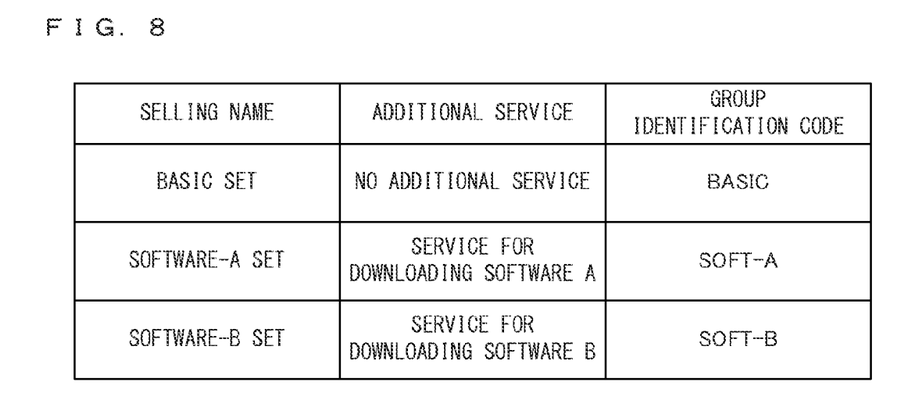
FIG. 8 is a diagram showing yet another non-limiting example of the manner of assigning the group identification code.

For example, as shown in FIG. 8, when the information processing apparatus 30 is sold as any one of three types of sets, namely a "basic set" in which no additional service is added, a "software-A set" in which a service for downloading software A (for example, a game program A) is added, and a "software-B set" in which a service for downloading software B (for example, a game program B) is added, different group identification codes are assigned to the information processing apparatus 30 for the respective sets.

(Specific Examples of Information Processing Based on Group Identification Code)

Next, descriptions are given of various specific examples of information processing based on the group identification code, which is performed by the server apparatus 10.

In a first specific example of information processing based on the group identification code, the server apparatus 10 provides the information processing apparatus 30 with various paid services. The types of the paid services can be any types. Examples of the types of the paid services include services for downloading paid contents (for example, a game program, additional data used in a game program, moving image data, and the like).

Figure 9:
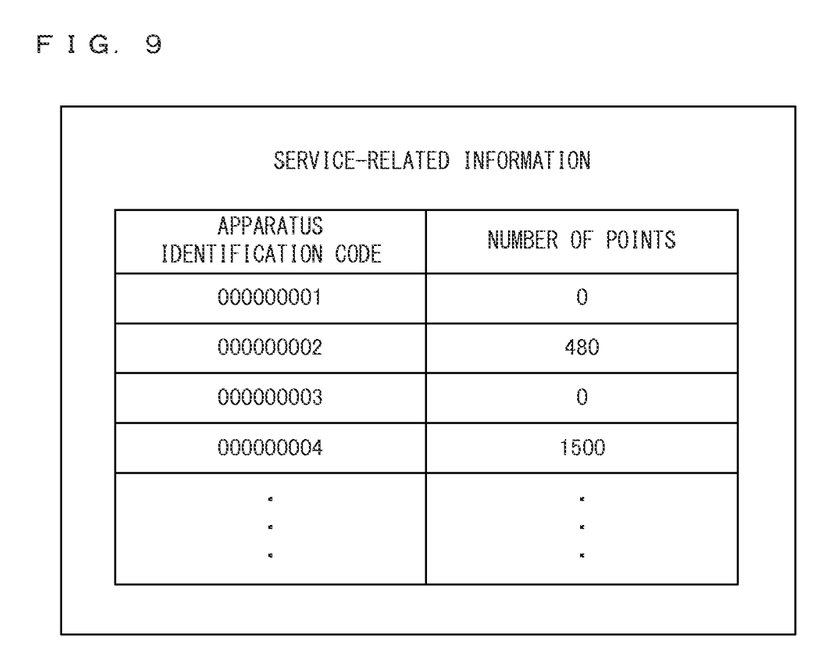
FIG. 9 is a diagram showing a non-limiting example of service-related information stored in the server apparatus.

The server apparatus 10 stores, as service-related information related to services to be provided to the users of the information processing apparatuses 30, the number of points with respect to each information processing apparatus 30 (or with respect to each of the users of the information processing apparatuses 30) in the storage device 12 as shown in FIG. 9. These points can be used as a substitute for cash to purchase a paid service provided by the server apparatus 10.

When having received from any one of the information processing apparatuses 30 a purchase request signal for requesting the purchase of a predetermined paid service, the server apparatus 10 performs the process of charging the user of the information processing apparatus 30 based on the paid service, and adds to the number of points of the information processing apparatus 30 a numerical value obtained by multiplying the price of the paid service by a coefficient based on the group identification code of the information processing apparatus 30.

For example, if an information processing apparatus 30 corresponding to the "basic set" shown in FIG. 6 has purchased a paid service, a numerical value corresponding to 1% of the price of the paid service is added to the number of points of the information processing apparatus 30. If an information processing apparatus 30 corresponding to the "premium set A" or the "premium set B" has purchased a paid service, a numerical value corresponding to 10% of the price of the paid service is added to the number of points of the information processing apparatus 30.

In a second specific example of information processing based on the group identification code, the server apparatus 10 provides the information processing apparatus 30 with a service for downloading various contents (for example, a game program, additional data used in a game program, moving image data, and the like).

When having received a download request signal from any one of the information processing apparatuses 30, the server apparatus 10 downloads to the information processing apparatus 30 a content based on the group identification code of the information processing apparatus 30.

For example, to an information processing apparatus 30 corresponding to the "32-Gb white version" shown in FIG. 7, data of a special vehicle (for example, a white vehicle) to be given only to a purchaser of this version is downloaded as additional data capable of being used in a racing game. To an information processing apparatus 30 corresponding to the "32-Gb black version", data of a special vehicle (for example, a black vehicle) to be given only to a purchaser of this version is downloaded. It should be noted that to an information processing apparatus 30 corresponding to the "8-Gb white version" or the "8-Gb black version", neither of the pieces of vehicle data described above is downloaded.

In addition, for example, to an information processing apparatus 30 corresponding to the "software-A set" as shown in FIG. 8, an application program of the software A is downloaded. To an information processing apparatus 30 corresponding to the "software-B set", an application program of the software B is downloaded. It should be noted that to an information processing apparatus 30 corresponding to the "basic set" in which no additional service is added, neither of the application programs described above is downloaded.

As described above, based on the exemplary embodiment, the server apparatus 10 can perform information processing based on the group identification code assigned to an information processing apparatus 30. Thus, for example, it is possible to provide different services to two information processing apparatuses 30 assigned different group identification codes. Further, it is possible to provide a particular service only to an information processing apparatus 30 assigned a particular group identification code.

In addition, based on the exemplary embodiment, when or before an information processing apparatus 30 is sold to a customer, the apparatus identification code and the group identification code assigned to the information processing apparatus 30 are registered in a database. This enables the server apparatus 10 to determine on the basis of the database a group identification code corresponding to the apparatus identification code transmitted from the information processing apparatus 30. This eliminates the need to store the group identification code in the information processing apparatus 30, and therefore, a service is not provided on the basis of a false group identification code transmitted from an information processing apparatus 30 of a malicious user (a group identification code falsified by the malicious user). This makes it possible to prevent the malicious user from abusing the service.

In addition, based on the exemplary embodiment, even if the user of an information processing apparatus 30 does not input an apparatus identification code or a group identification code through the input apparatus 34, the server apparatus 10 can perform information processing based on the apparatus identification code assigned to the information processing apparatus 30. This makes it possible to save the user the trouble of inputting an apparatus identification code or a group identification code.

In addition, based on the exemplary embodiment, it is possible to change the content of a service to be provided by the server apparatus 10 at any timing even after an information processing apparatus 30 is sold. Thus, for example, if a particular set or version among a plurality of sets or versions of information processing apparatuses 30 sells poorly, it is also possible to provide an information processing apparatus 30 in the particular set or version with a further additional service (for example, a service for downloading a particular application program free of charge), instead of lowering the selling price of the particular set or version.

In addition, based on the exemplary embodiment, for example, it is also possible to sell two information processing apparatuses 30 having exactly the same bundled item, specifications, and package, for different prices by adding different additional services to the information processing apparatuses 30. Thus, it is possible to sell a diverse lineup of information processing apparatuses without changing a bundled item, specifications, or a package, and therefore increase customer satisfaction.

(Variation)

It should be noted that in the above exemplary embodiment, as shown in FIG. 5, the information representing the correspondence relationship between the apparatus identification code and the group identification code is transmitted to the server apparatus 10 and registered in the database before the information processing apparatus 30 is shipped from the factory; however, the information representing the correspondence relationship between the apparatus identification code and the group identification code may be transmitted to the server apparatus 10 at any timing when or before the information processing apparatus 30 is actually sold to a customer. For example, when an information processing apparatus 30 has been sold to a customer at a store, the information representing the correspondence relationship between the apparatus identification code and the group identification code of the sold information processing apparatus 30 may be transmitted as needed from a computer of the store (for example, a POS register) to the server apparatus 10.

In addition, the processing performed by the server apparatus 10 in the exemplary embodiment may be performed by any information processing system (server system). For example, an information processing system having a plurality of processors may be used instead of the server apparatus 10, and the processing may be performed by the plurality of processors. The plurality of processors may be provided together in the same information processing apparatus, or may be provided in different information processing apparatuses.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A service provision system comprising:
   a server system,
   a factory computer, and
   a plurality of information processing apparatuses,
   the plurality of information processing apparatuses having a common device ID, each of the information processing apparatuses being assigned, at a time of manufacturing at a factory, an apparatus identification code uniquely assigned to the information processing apparatus and a group identification code commonly assigned to at least two or more of the information processing apparatuses,
   the factory computer comprising
   a transmission unit configured to transmit to the server system, electronic data messages that include (a) the apparatus identification codes that are each uniquely assigned to different ones of at least two or more of the information processing apparatuses and (b) the group identification code commonly assigned to at least two or more of the information processing apparatuses at the time of manufacturing at the factory,
   each of the information processing apparatuses comprising:
   a storage unit configured to store the apparatus identification code assigned to the information processing apparatus;
   a first communication unit configured to communicate with the server system; and
   a transmission unit configured to, when the information processing apparatus accesses the server system in accordance with an instruction by a customer, read the apparatus identification code from the storage unit and transmit the read apparatus identification code to the server system,
   the server system comprising:
   a transceiver configured to receive, from the factory computer in the factory that manufactured the information processing apparatuses, the electronic data messages that include the apparatus identification codes that are each uniquely assigned to the at least two or more of the information processing apparatuses and the group identification code commonly assigned to at least two or more of the information processing apparatuses;
   a storage control unit configured to store, in response to receiving the electronic data messages from the factory computer, a correspondence relationship, in a database, that links the apparatus identification code of the at least two or more of the information processing apparatuses to the group identification code assigned to each of the information processing apparatuses;
   a second communication unit configured to communicate with each of the information processing apparatuses;
   a determination unit configured to, when the second communication unit is accessed by any one of the information processing apparatuses (hereinafter referred to as a "first information processing apparatus") sold to a customer, receive the apparatus identification code corresponding to the first information processing apparatus from the first information processing apparatus, and acquire a group identification code corresponding to the received apparatus identification code from the database, thereby determining a group identification code corresponding to the first information processing apparatus; and
   an information processing unit configured to provide, in accordance with the group identification code determined by the determination unit, a service used by the first information processing apparatus via a network.

2. The service provision system according to claim 1, wherein
   the plurality of information processing apparatuses include information processing apparatuses in a plurality of versions different from each other in specifications, and
   each of the information processing apparatuses is assigned the group identification code based on a corresponding one of the plurality of versions.

3. The service provision system according to claim 1, wherein
   each of the information processing apparatuses is sold as any one of a plurality of types of sets different from each other in bundled item, and
   the information processing apparatus is assigned the group identification code based on the type of the set of the information processing apparatus.

4. The service provision system according to claim 1, wherein
   each of the information processing apparatuses is sold from among a plurality of information processing apparatus types that are different from each other in additional service,
   the information processing apparatus is assigned the group identification code based on a corresponding one of the plurality of information processing apparatus types, and
   the information processing unit provides the additional service in accordance with the group identification code determined by the determination unit.

5. The service provision system according to claim 1, wherein
   when the group identification code determined by the determination unit is a particular group identification code, the information processing unit performs information processing for providing a user of the first information processing apparatus with a particular service corresponding to the particular group identification code.

6. The service provision system according to claim 1, wherein
   the information processing unit downloads to the first information processing apparatus an application program or data based on the group identification code determined by the determination unit.

7. The service provision system according to claim 1, wherein the server system further comprises a service-related information storage unit configured to store service-related information related to a service to be provided to users of the information processing apparatuses, with respect to each information processing apparatus or each user, and the information processing unit creates or updates the service-related information corresponding to the first information processing apparatus or the user of the first information processing apparatus in accordance with the group identification code determined by the determination unit.

8. The service provision system according to claim 7, wherein the service-related information includes the number of points capable of being used as a substitute for currency, and the information processing unit adds a point to the number of points included in the service-related information corresponding to the first information processing apparatus or the user of the first information processing apparatus in accordance with the group identification code determined by the determination unit.

9. A service provision method to be executed by a service provision system including a server system, a factory computer system, and a plurality of information processing apparatuses, the plurality of information processing apparatuses having a common device ID, each of the information processing apparatuses being assigned, at a time of manufacturing at a factory, an apparatus identification code uniquely assigned to the information processing apparatus and a group identification code commonly assigned to at least two or more of the information processing apparatuses, the factory computer system comprising a transmission unit configured to transmit to the server system, electronic data messages that include (a) the apparatus identification codes that are each uniquely assigned to different ones of at least two or more of the information processing apparatuses and (b) the group identification code commonly assigned to at least two or more of the information processing apparatuses at the time of manufacturing at the factory, the service provision method comprising:

at the factory computer system, transmitting, to the server system, electronic data messages that include the apparatus identification codes that are each uniquely assigned to the at least two or more of the information processing apparatuses and the group identification code commonly assigned to at least two or more of the information processing apparatuses at the time of manufacturing at the factory:

at the server system, receiving, from the factory computer system in the factory that manufactured the information processing apparatuses, electronic data messages that include the apparatus identification codes that are each uniquely assigned to the at least two or more of the information processing apparatuses and the group identification code commonly assigned to at least two or more of the information processing apparatuses;

in the server system, storing, in response to reception of the electronic data messages sent from the factory computer system, a correspondence relationship, in a database, that links the apparatus identification code of the at least two or more of the information processing apparatuses to the group identification code assigned to each of the information processing apparatuses;

in the information processing apparatus, when any one of the information processing apparatuses has communicated with the server system, reading the apparatus identification code assigned to the information processing apparatus from a storage unit of the information processing apparatus and transmitting the read apparatus identification code to the server system;

in the server system, acquiring from the database a group identification code corresponding to the apparatus identification code received from the information processing apparatus, thereby determining a group identification code corresponding to the information processing apparatus; and in the server system, performing information processing for providing, in accordance with the group identification code determined by the determination unit, an electronic service used from the information processing apparatus via a network.

10. A server system for providing a plurality of information processing apparatuses with a service capable of being used from the information processing apparatuses via a network, the plurality of information processing apparatuses having a common device ID, each of the information processing apparatuses being assigned, at a time of manufacturing at a factory, a) an apparatus identification code uniquely assigned to the information processing apparatus and stored in non-volatile memory of the information processing apparatus and 2) a group identification code commonly assigned to at least two or more of the information processing apparatuses, the server system coupled to a factory computer that is at the factory, the factory computer configured to transmit to the server system, electronic data messages that include (a) apparatus identification codes that have been each uniquely assigned to different ones of at least two or more of the information processing apparatuses and (b) the group identification code commonly assigned to at least two or more of the information processing apparatuses at the time of manufacturing at the factory, the server system comprising:

a transceiver configured to:

receive, from the factory computer in the factory that manufactured the information processing apparatuses, electronic data messages that include the apparatus identification codes that are each uniquely assigned to the at least two or more of the information processing apparatuses and the group identification code commonly assigned to at least two or more of the information processing apparatuses, and communicate with each of the information processing apparatuses a storage system that includes electronic memory, the storage system configured to store, based on to reception of the electronic data messages, a correspondence relationship in a database that links the apparatus identification code of the at least two or more of the information processing apparatuses to the group identification code assigned to each of the information processing apparatuses;

a processing system that includes at least one hardware processor, the processing system configured to:

when the communication unit has communicated with any one of the information processing apparatuses sold to a customer, receive, via the transceiver and from the information processing apparatus, the apparatus identification code stored in non-transitory storage of the information processing apparatus and assigned to the information processing apparatus, acquire, from the database, a group identification code corresponding to the received apparatus identification code, thereby determining a group identification code corresponding to the information processing apparatus, and execute information processing, in accordance with the group identification code determined by the determination unit, that includes service processing for the information processing apparatus that transmitted the identification code stored in non-transitory storage of the information processing apparatus.

11. A non-transitory computer-readable storage medium having stored therein a service provision program to be executed by a server system for providing a plurality of information processing apparatuses with a service capable of being used from the information processing apparatuses via a network, the plurality of information processing apparatuses having a common device ID, each of the information processing apparatuses being assigned, at a time of manufacturing at a factory, an apparatus identification code uniquely assigned to the information processing apparatus and a group identification code commonly assigned to at least two or more of the information processing apparatuses, the server system coupled to a factory computer that is at the factory, the factory computer configured to transmit, to the server system, electronic data messages that include the apparatus identification codes that are each uniquely assigned to the at least two or more of the information processing apparatuses and the group identification code commonly assigned to at least two or more of the information processing apparatuses at the time of manufacturing at the factory, the service provision program causing a computer of the server system to execute:

accepting, from the factory computer in the factory that manufactured the information processing apparatuses, electronic data messages that include the apparatus identification codes that are each uniquely assigned to the at least two or more of the information processing apparatuses and the group identification code commonly assigned to at least two or more of the information processing apparatuses;

storing, in response to reception of the electronic data messages sent from the factory computer, a correspondence relationship in a database that links the apparatus identification code of the at least two or more of the information processing apparatuses to the group identification code assigned to each of the information processing apparatuses;

communicating with each of the information processing apparatuses;

when, in the communication, the server system has communicated with any one of the information processing apparatuses sold to a customer, accepting from the information processing apparatus the apparatus identification code stored in a storage unit of the information processing apparatus and assigned to the information processing apparatus, and acquiring a group identification code corresponding to the received apparatus identification code from the database, thereby determining a group identification code corresponding to the information processing apparatus; and performing information processing for providing, in accordance with the group identification code determined in the determination, an electronic service that is used by the information processing apparatus via a network.

12. The server system of claim 10, wherein the service processing includes transmitting, to the information processing apparatus that transmitted the identification code, an application program or content based on the determined group identification code.

13. The server system of claim 10, wherein the service processing includes determination of a number of points based on the determined group identification code.

* * * * *